(12) United States Patent
Tamlin (10) Patent No.: US 10,406,531 B2
(45) Date of Patent: Sep. 10, 2019

(54) CRUSHING MACHINE WITH RECIPROCATING CONVEYOR AND RECIPROCATING CONVEYOR WITH SCRAPER BAR

(71) Applicant: Mayfran International, Inc., Cleveland, OH (US)

(72) Inventor: Paul Robert Tamlin, Lindsay (CA)

(73) Assignee: Mayfran International, Inc., Cleveland, OH (US)

( * ) Notice: Subject to any disclaimer, the term of this patent is extended or adjusted under 35 U.S.C. 154(b) by 437 days.

(21) Appl. No.: 15/236,679

(22) Filed: Aug. 15, 2016

(65) Prior Publication Data

US 2017/0043963 A1    Feb. 16, 2017

Related U.S. Application Data

(60) Provisional application No. 62/205,168, filed on Aug. 14, 2015.

(51) Int. Cl.
| | |
|---|---|
| *B65G 45/14* | (2006.01) |
| *B08B 1/00* | (2006.01) |
| *B02C 23/02* | (2006.01) |
| *B02C 21/02* | (2006.01) |

(52) U.S. Cl.
CPC .............. *B02C 23/02* (2013.01); *B08B 1/005* (2013.01); *B65G 45/14* (2013.01); *B02C 21/02* (2013.01)

(58) Field of Classification Search
CPC ................................ B65G 45/14; B08B 1/005

USPC ............................ 198/498; 15/256.5, 236.08
See application file for complete search history.

(56) References Cited

U.S. PATENT DOCUMENTS

| | | | | | |
|---|---|---|---|---|---|
| 950,874 | A * | 3/1910 | Wilson et al. | ......... | B65G 45/14 198/498 |
| 3,288,275 | A * | 11/1966 | Bunting | ............... | B65G 45/105 198/498 |
| 3,913,728 | A * | 10/1975 | Pott | ........................ | B65G 45/12 198/498 |
| 4,887,329 | A * | 12/1989 | Perneczky | .............. | B21B 28/04 15/256.53 |
| 7,207,431 | B1* | 4/2007 | Singleton | ............... | B65G 25/02 15/256.53 |
| 7,584,835 | B2* | 9/2009 | Wimsatt | ................... | B08B 1/02 198/494 |
| 9,016,462 | B2* | 4/2015 | Fries | ...................... | B65G 45/16 198/497 |

(Continued)

*Primary Examiner* — James R Bidwell
(74) *Attorney, Agent, or Firm* — Calfee, Halter & Griswold LLP (57) ABSTRACT

An exemplary crushing machine has a crusher for crushing media into crushed media, a reciprocating conveyor having a tray for receiving crushed media from the crusher, and a belt conveyor for receiving crushed media from the reciprocating conveyor and conveying the crushed media to a desired location. The reciprocating conveyor optionally includes a conveyor scraper that has a blade having a plurality of teeth extending to the tray, a blade support disposed proximate and transverse the tray of the conveyor, a hingeable connection attaching the blade to the blade support, at least one guide slideably supporting the blade support, and at least one actuator for actuating the scraper. Movement of the conveyor scraper across the tray prevents crushed media from sticking to the tray of the conveyor.

15 Claims, 9 Drawing Sheets

(56) References Cited

U.S. PATENT DOCUMENTS

2009/0025752 A1\* 1/2009 Rui .................... B08B 1/008
134/6

\* cited by examiner

CRUSHING MACHINE WITH RECIPROCATING CONVEYOR AND RECIPROCATING CONVEYOR WITH SCRAPER BAR

CROSS-REFERENCE TO RELATED APPLICATIONS

This application claims priority to and the benefit of U.S. Provisional Patent Application No. 62/205,168, filed on Aug. 14, 2015, which is incorporated herein by reference in its entirety.

TECHNICAL FIELD

The present invention relates generally to crushing machines for crushing stone, concrete, asphalt, or similar materials into crushed media, conveyor systems for moving crushed media, and methods of using the same.

BACKGROUND OF THE INVENTION

Conveyor systems are known to those skilled in the art, e.g. belt systems, roller systems, and vibrating systems. Conveyor systems receive media and carry it over a distance to deliver the media at a destination location, which can be another conveyor system. The type of conveyor selected is dependent on the media to be moved. For example, a roller conveyor system would not be used with media that could fall between the rollers. In some cases, the media carried by the conveyor systems causes damage and wear to the components of the system, such as a belt, necessitating replacement of the worn or damaged components.

Applicants have appreciated the need for a conveyor system that has sufficient durability and resilience to withstand the impact from particulate or clay media generated when stone, concrete, asphalt, or similar materials are crushed in a crushing device.

SUMMARY

Exemplary embodiments of crushing machines, conveyor systems for moving crushed media, and methods of conveying crushed media are disclosed herein.

An exemplary crushing machine has a crusher for crushing media into crushed media, a reciprocating conveyor having a tray for receiving crushed media from the crusher, and a belt conveyor for receiving crushed media from the reciprocating conveyor and conveying the crushed media to a desired location.

An exemplary conveyor system has a conveyor with a tray for receiving crushed media and a conveyor scraper. The conveyor scraper has a blade with a plurality of teeth extending to the tray, a blade support disposed proximate and transverse the tray of the conveyor, a hingeable connection attaching the blade to the blade support, at least one guide slideably supporting the blade support, and at least one actuator for actuating the scraper. Movement of the conveyor scraper across the tray prevents crushed media from sticking to the tray of the conveyor.

Still another exemplary embodiment of the present disclosure relates to a method for conveying crushed media. The method includes providing a conveyor having a tray for receiving crushed media, providing a conveyor scraper, reciprocating the tray more slowly in a direction of travel than in a return direction to cause the crushed media to move along the tray in the direction of travel, and reciprocating the conveyor scraper across the tray to prevent the clay media from sticking. The conveyor scraper has a blade with a plurality of teeth extending to the tray, a blade support disposed proximate and transverse the tray of the conveyor, a hingeable connection attaching the blade to the blade support, at least one guide slideably supporting the blade support, and at least one actuator for actuating the scraper. Movement of the conveyor scraper across the tray prevents crushed media from sticking to the tray of the conveyor.

BRIEF DESCRIPTION OF THE DRAWINGS

These and other features and advantages of the present invention will become better understood with regard to the following description and accompanying drawings in which.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless a limiting definition is expressly provided herein.

Crushing devices may be used to crush media such as stone, concrete, asphalt, or the like into crushed media that includes particulates of various sizes and clay-like media. Conveyor systems may be used to move the crushed media within the crushing device and to carry the crushed media away from the crushing device. Photographs and three-dimensional renderings of an exemplary crushing machine including a conveyor of the present disclosure are shown in FIGS. 4-10.

Figure 1:
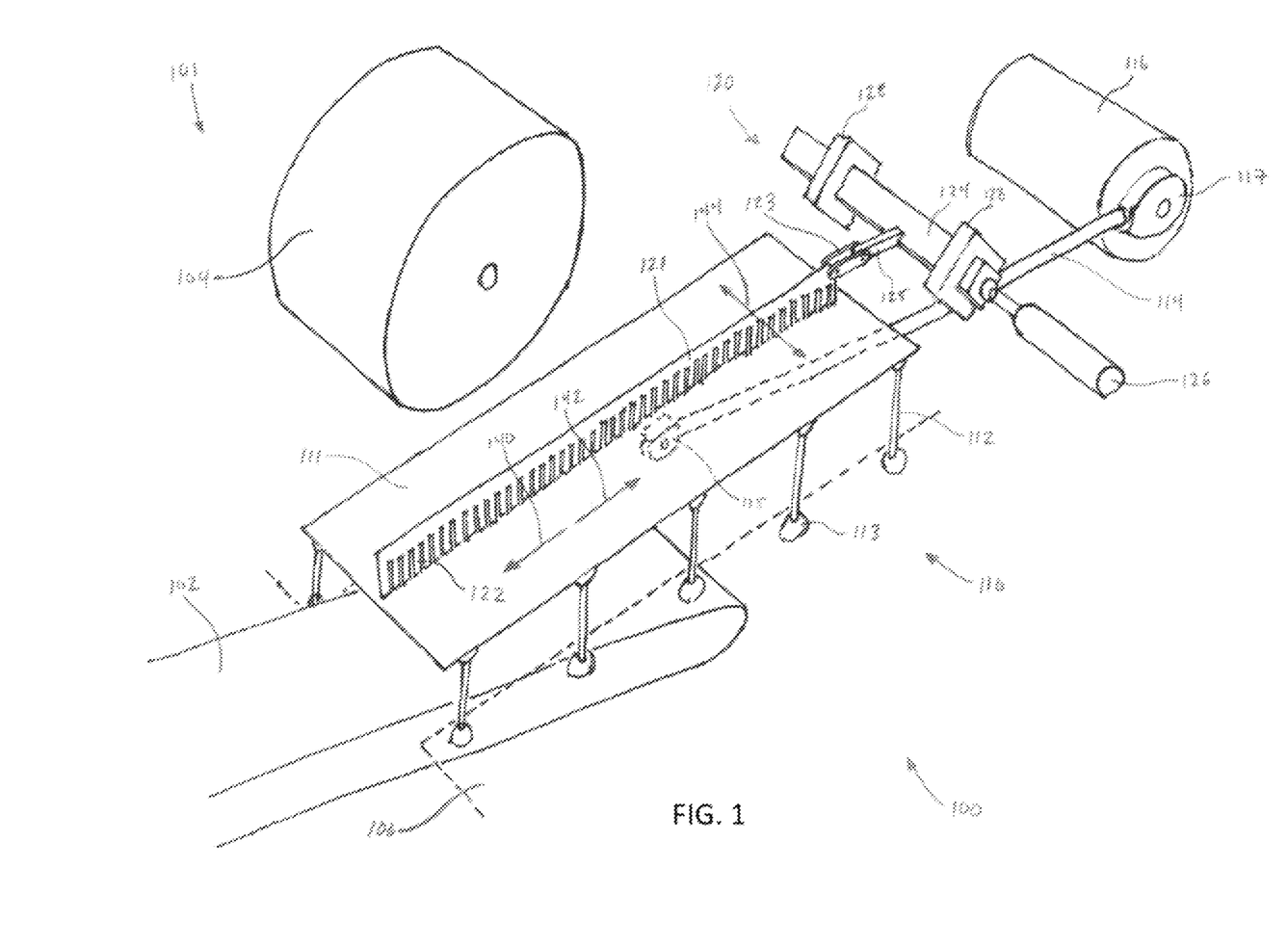
FIG. 1 is a perspective view of an exemplary conveyor system.

Referring now to FIG. 1, an exemplary conveyor system 100 is shown. The conveyor system 100 has a reciprocating conveyor 110 and a conveyor scraper 120. As used herein, the term "reciprocating" (and "reciprocate" and similar other forms) means movement back and forth without regard to velocities, accelerations, and decelerations in the movement back and forth. The conveyor system 100 is installed in a crushing machine 101 that has a belt conveyor 102, a crusher 104, and a body 106. The reciprocating conveyor 110 is positioned above the belt conveyor 102 and below the crusher 104. Crushed media from the crusher 104 falls onto the reciprocating conveyor 110 and is conveyed to the belt conveyor 102. The belt conveyor 102 receives the crushed media and carries it to a desired location, such as, for example, a collection pile, a dump truck, another conveyor system, or the like.

Foreign objects present in the crushed media, such as reinforcing steel rods, could cause damage to the belt conveyor 102 upon impact. The reciprocating conveyor 110, however, is more durable than the belt conveyor 102 and is less prone to be damaged by impacts from foreign objects in the crushed media. Therefore, positioning the reciprocating conveyor 110 such that it protects the belt conveyor 102 from the initial impact of crushed media significantly reduces the likelihood that the belt conveyor 102 will be damaged. This can result in significant cost savings and reduced downtime, as belts of belt conveyors expensive and the machine must be shut down to replace a damaged belt.

A tray 111 of the reciprocating conveyor 110 is supported by support members 112 above the belt conveyor 102 and body 106 of the crushing machine 101. The support members 112 are connected to the tray 111 and the body 106 by resilient elements 113 at both ends. The resilient elements 113 allow the tray 111 to be moved back and forth in a reciprocating fashion by an arm 114 connected to a drive motor 116. The resilient elements 113 can be, for example, Part No. AU45 by Rosta.

While the tray 111 is shown as a flat plate in FIG. 1, the tray can take on any shape. For example, the tray 111 can be generally concave and can include sides (not shown in the figures; see Appendix) that prevent media from falling off of the tray 111. The tray 111 is formed of a AR400 steel plate, but it can be formed of any suitably hard and strong material.

The arm 114 is connected to the tray 111 by a resilient linkage 115 on the underside of the tray 111. The resilient linkage 115 can be, for example, Part No. ST60 by Rosta. A drive mechanism 117 connects the arm 114 to the motor 116. While a rotating motor is shown in FIG. 1, the tray 111 can be similarly reciprocated by a linear motor, a rotary actuator, a linear actuator, or the like. In some exemplary embodiments, the drive mechanism 117 of the reciprocating conveyor 110 is a differential motion transmission box or "Shuffle Drive" similar to that described in the following patents and applications, all of which are incorporated herein by reference in their entireties: U.S. Pat. Nos. 6,415,912, 6,634,488, and 6,736,342; co-pending U.S. patent application Ser. No. 14/373,106, filed Jul. 18, 2014; and Canadian Patent No. 2,313,777. In other exemplary embodiments the drive mechanism 117 is a motor in a simple oscillating configuration (not shown) such as an arm (not shown) at the end of a motor drive shaft that simply vibrates the tray 111 back and forth (without the special accelerations and decelerations of a shuffle drive or the other drives incorporated by reference).

The drive mechanism 117 causes the arm 114 to drive the tray 111 in different motion configurations. For example, in some exemplary embodiments, the tray 111 is driven relatively slowly in the conveyance direction 140 (so that friction keeps the crushed media in place on the tray 111) and relatively quickly in the opposite direction 142 (so that friction is overcome and the tray 111 slides underneath the crushed media on the tray 111). This results in one movement phase of the crushed media per back and forth cycle of the tray 111. Other exemplary motions are discussed below and in the documents incorporated by reference. In a preferred embodiment, tray 111 is not simply vibrated back and forth, which is less efficient in moving material.

The tray 111 can also have some vertical movement, e.g., some vertical movement of the entire tray 120 or alternating vertical movements of the ends the tray 120 (like a lever with a pivot point in the middle). The displacement of the tray 111 can vary depending on the type of crushed media and the characteristics of the crushing machine 101. In any event, the tray 111 can be moved so that it conveys crushed media from the crusher 104 to the belt conveyor 102. In some exemplary embodiments, the tray 111 is also inclined so that gravity will assist movement of the crushed media in the direction of conveyance 140.

The conveyor system 100 can optionally include at least one conveyor scraper 120. The conveyor scraper 120 includes a blade 121, a blade support 124, and an actuator 126. In some exemplary embodiments, the blade 121 is generally straight and has a plurality of teeth 122 that extend down to the tray 111. The teeth 122 are generally rectangular, but can be any suitable shape. Other configurations for the scraper blade 121 are possible, e.g.: a saw blade design with triangular cutting teeth. While the conveyor scraper 120 is shown with a reciprocating conveyor system 110, it can also be used with other types of conveyor systems, such as, for example, a vibratory conveyor system, an oscillating conveyor system, or a linear shaker conveyor system.

A resilient linkage 123 connects the blade 121 to a support arm 125 of the blade support 124. The blade support 124 is slideably supported by two guides 128 so that the blade 121 is properly positioned on the tray 111. The actuator 126 moves the blade support 124 back and forth in a transverse direction 144 across the conveyor system 110 causing the blade 121 to be moved back and forth across tray 111. As the blade 121 travels across the tray 111, the teeth 122 cut through or break up or otherwise move the crushed media accumulated on the tray 111 to prevent it from sticking to the surface of the tray 111. In some uses, a thin layer of crushed media can build up on the tray 111 such that the teeth 122 of the blade 121 slide over the thin layer of crushed media. The conveyor scraper 120 is particularly useful in wet environments where the crushed media can comprise a clay or mud-like substance that is more prone than dry media to stick to the tray 111 and render it inoperable to convey the crushed media.

In some exemplary embodiments, the blade 121 is formed of a AR400 steel plate and weighs approximately 150 pounds, but it can be formed of any suitably hard and strong material. In the illustrated embodiment, only one blade 121 is shown. In other embodiments, additional blades can be added to the conveyor scraper 120. The additional blades would be connected to the blade support 124 by additional support arms and linkages similar to the support arm 125 and linkage 123 in the illustrated embodiment.

In some exemplary embodiments, the blade support 124 is rectangular, e.g., square shaped. In some exemplary embodiments, the blade support 124 is oriented so that a corner is pointed upward. The square shape of the exemplary blade support 124 shown makes it easier to align with square guides 128. The orientation of the blade support 124 prevents crushed media or debris from gathering on the support 124 that could reduce the performance of the scraper 120.

The actuator 126 moves the blade support 124. The stroke of the actuator 126 is sufficient to move the blade 121 across the full width of the tray 111. If the conveyor scraper 120 includes more than one parallel blade 121 (not shown), the stroke of the actuator 126 can be shortened. In some exemplary embodiments, the actuator 126 is a hydraulic piston. The actuator 126 can be any type of actuator, such as, for example, a pneumatic cylinder, a linear actuator, a linear motor, a belt drive, a chain drive, a gear drive, or the like, configured to move the blade 121 back and forth across the tray 111.

Figure 12:
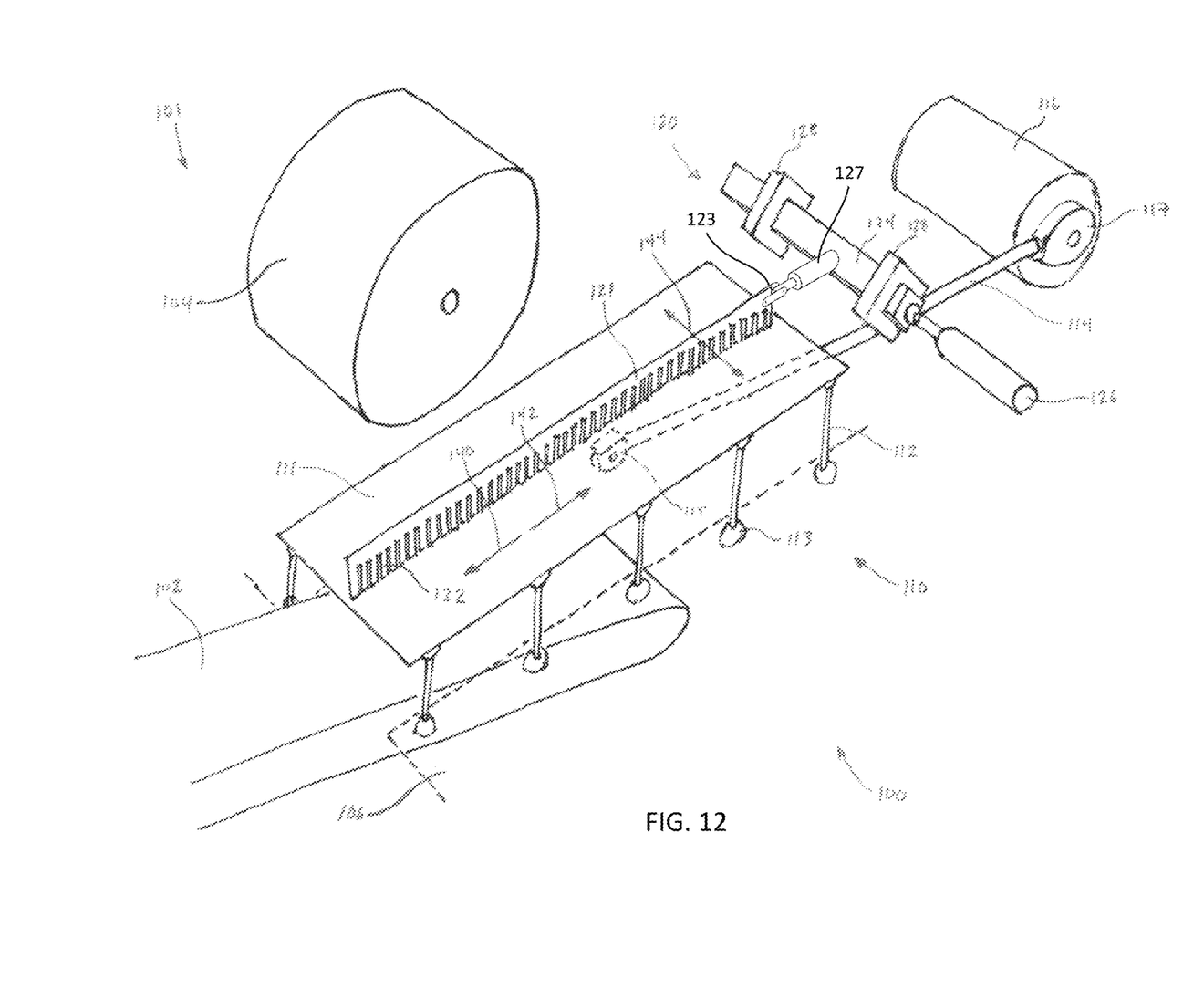
FIG. 12 is a perspective view of an exemplary conveyor system.

In some exemplary embodiments, the blade 121 is attached to the blade support 124 with a second actuator 127 (FIG. 12) to facilitate movement of the blade 121 along the tray 111 in the conveyance direction 140 and opposite direction 142. In some exemplary embodiments, movement in the conveyance, opposite, and transverse directions 140, 142, 144 is combined to move the blade 121 in an elliptical pattern on the tray 111. In some exemplary embodiments, combined movement in the conveyance, opposite, and transverse directions 140, 142, 144 allows the blade to be moved in a circular, rectangular, or any other shaped path along the tray 111. In some exemplary embodiments, the blade 121 is moved in the conveyance and opposite directions 140, 142 at a different frequency than the movement of the tray 111 in the conveyance and opposite directions 140, 142.

Figure 2:
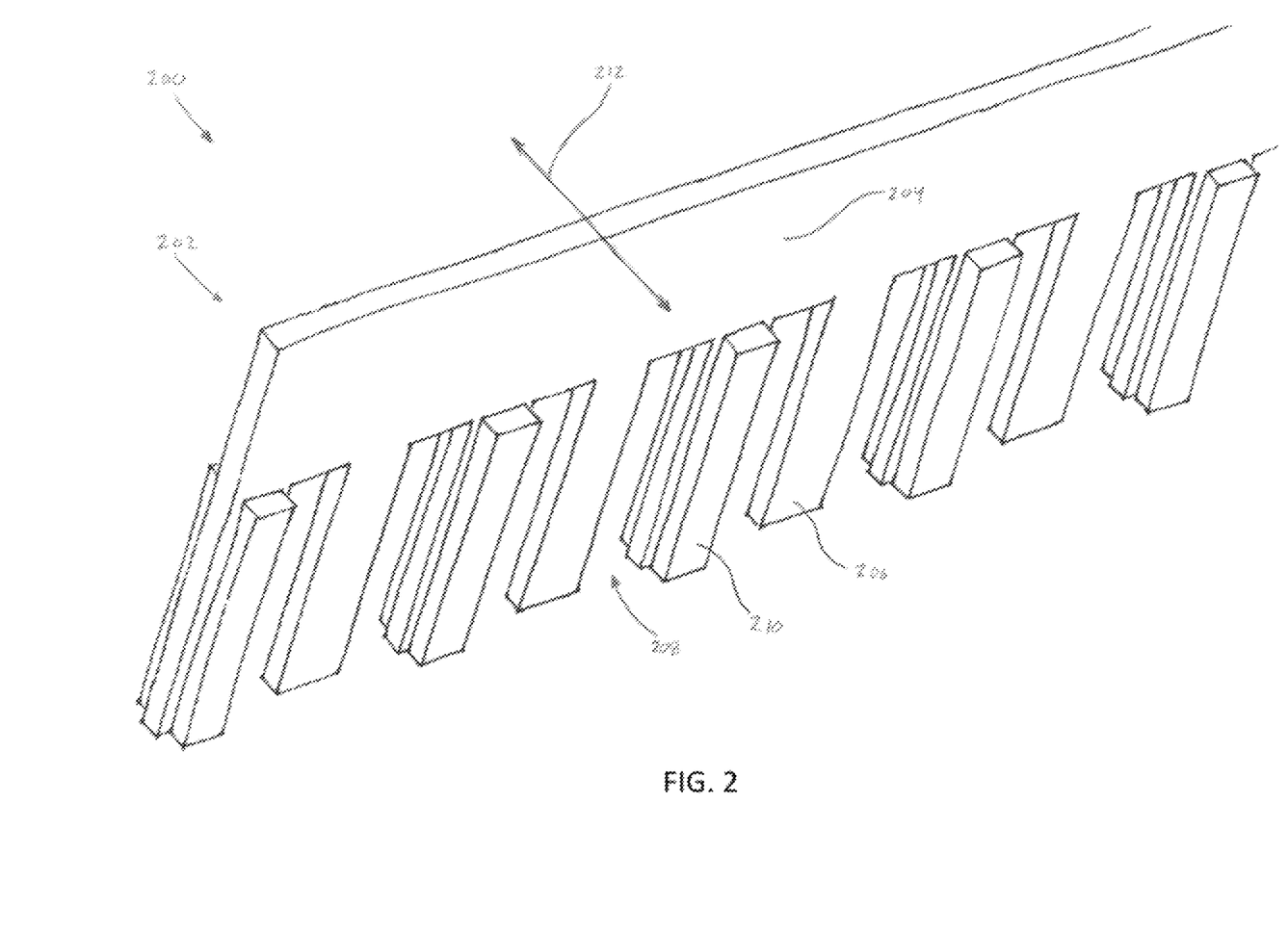
FIG. 2 is a perspective view of an exemplary conveyor scraper of an exemplary conveyor system.

Referring now to FIG. 2, another exemplary embodiment of a blade 202 of a conveyor scraper 200 is shown. Exemplary blade 202 can be used in any exemplary conveyor scraper, such as the conveyor scraper 120 shown in FIG. 1. The blade 202 has a blade back 204 (as used herein, a blade back is the part opposite the teeth that faces up in normal use) and a plurality of teeth 206 extending downward from the blade back 204. Gaps 208 separate the teeth 206 and allow crushed media to pass through the blade 202 as it is drawn across a conveyor. The gaps 208 can be about ⅜ inches to about 2½ inches tall, or about ½ inches to about 1½ inches tall, or about ⅜ inches to about ¾ inches tall. In exemplary embodiments, the gaps 208 are about ¾ inches tall. Gaps 208 that are shorter prevent foreign objects (such as wire and rebar) from becoming stuck in the gaps 208 of the blade. The gaps 208 can be about ¾ inches wide or wider depending on the type of crushed media.

In exemplary embodiments, a plurality of cutting members 210 are attached to the teeth 206 on one or both sides of the blade 202. The cutting members 210 cut through or break up or otherwise move the crushed media as the blade 202 is moved back and forth across a conveyor in the scraping direction 212. In the illustrated embodiment, the cutting members 210 have a 3 inch pitch, that is, the cutting members 210 are attached to the blade 202 at 3 inch intervals. The spacing between the cutting members 210 can be changed to based on the crushed media being scraped, or on the spacing of the teeth 206 of the blade 202. The cutting members 210 can be bar shaped, as shown, or can be any other shape suitable for cutting through crushed media collecting on a conveyor.

Figure 3:
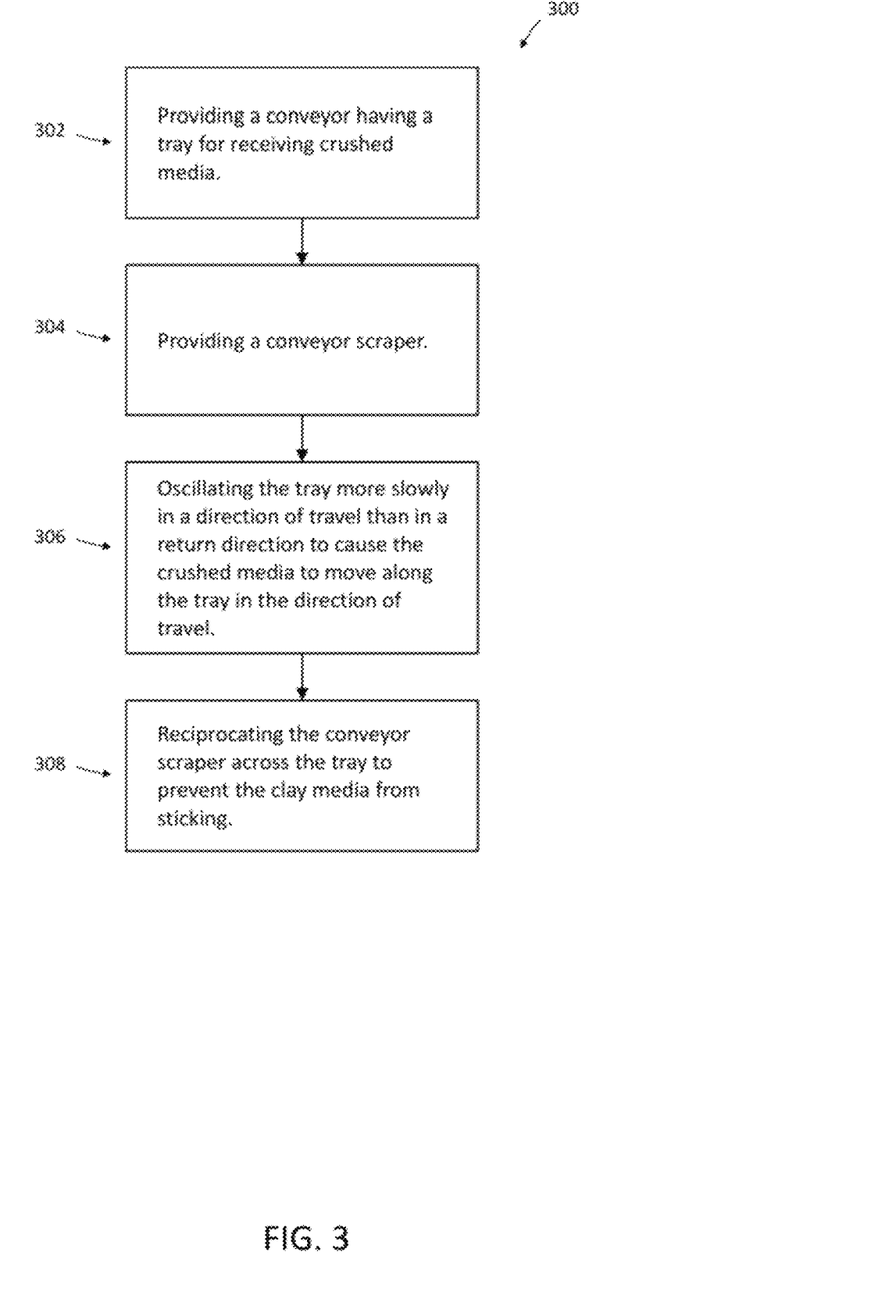
FIG. 3 is a flow chart describing the steps of an exemplary method of conveying particulate and clay media.

Referring now to FIG. 3, a flow chart of an exemplary method 300 of conveying crushed media is shown. The exemplary method 300 includes: providing a conveyor having a tray for receiving crushed media, at 302; providing a conveyor scraper, at 304; reciprocating the tray more slowly in a direction of travel than in a return direction to cause the crushed media to move along the tray in the direction of travel, at 306; and reciprocating the conveyor scraper across the tray to prevent the clay media from sticking, at 308. Exemplary method 300 can be implemented with any of the exemplary conveyor systems 100, 200 described above, or another conveyor system. This exemplary method can be performed with the structures shown in FIGS. 1-2 and described in the text above.

In some exemplary embodiments, the conveyor scraper is run continuously across the tray. In some exemplary embodiments, the conveyor scraper is run intermittently when an operator sees a need to scrape the tray of the reciprocating conveyor. In some exemplary embodiments, the conveyor scraper has a period of about 10-300 seconds, or about 30-240 seconds or about 40 seconds. That is, in exemplary embodiments, the blade completes one complete scraping cycle back and forth about every 10-300 seconds, or about every 30-240 seconds, or about every 40 seconds. As used herein, the word "period" means the time for one complete cycle of motion and is intended to include the time for one complete cycle of oscillation and the time for one complete cycle of reciprocation and other cyclical motions. In some exemplary embodiments, the conveyor scraper is moved at a speed of about 2-40 feet/min, or about 5-20 feet/min, or about 12 feet/min. The period and speed of the conveyor scraper will vary depending on the application and type of crushed media.

In some exemplary embodiments, the conveyor tray 111 has a period of about 0.3-1.0 seconds, or about 0.4-0.6 seconds, or about 0.5 seconds. That is, in exemplary embodiments, the tray 111 completes one complete cycle back and forth about every 0.3-1.0 seconds, or about every 0.4-0.6 seconds, or about every 0.5 seconds. Obviously, those skilled in the art can convert these periods to frequencies. Thus, in some exemplary embodiments, the tray 111 reciprocates relatively quickly with respect to the slow-moving scraper. In some exemplary embodiments, the stroke of the tray 111 is about 3 inches. In some exemplary embodiments, the above speeds and stroke of the tray 111 move the crushed media across the tray 111 at about 20 feet/min.

Figure 4:
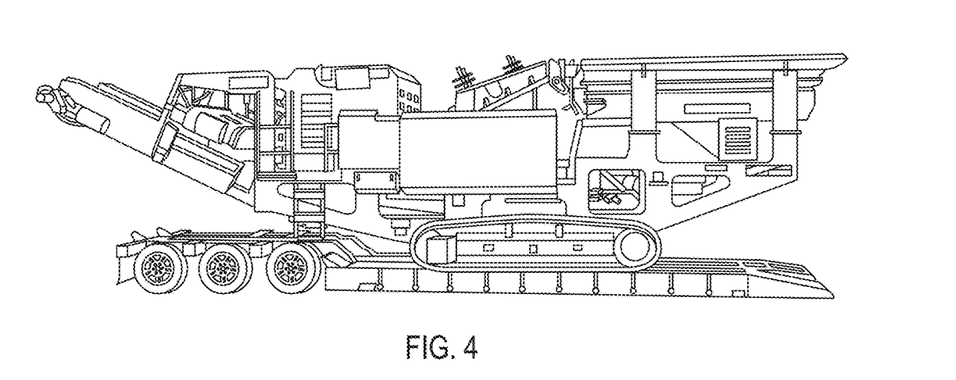
FIG. 4 is a photograph of an exemplary crushing machine.

Referring now to FIG. 4, an exemplary crushing machine is shown. Media enters the machine in the upper right, is crushed, and exits the machine on the belt conveyor to the left.

Figure 5:
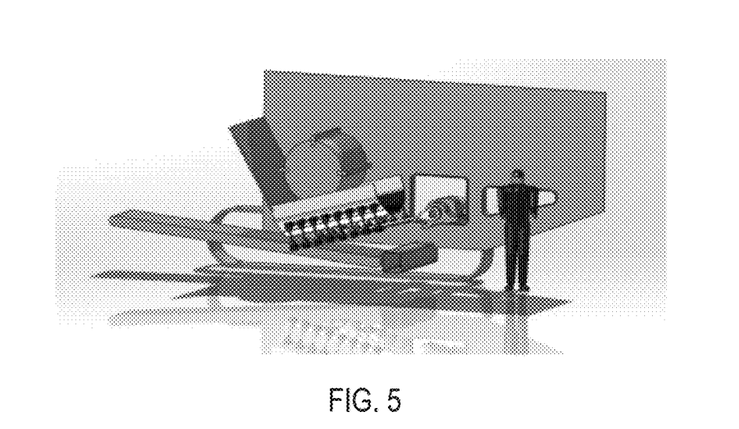
FIG. 5 is a perspective view of an exemplary conveyor installed in a portion of a crushing machine.

Referring now to FIG. 5, a three dimensional rendering shows an exemplary reciprocating conveyor installed in a crushing machine. Portions of the crushing machine are removed to more clearly show the arrangement of the conveyor inside the crushing machine. The wheel in the center is the crushing wheel of the crushing machine. The reciprocating conveyor is shown with a generally U-shaped cross section and delivers crushed media from the crushing wheel to the belt conveyor at the bottom of the image.

Figure 6:
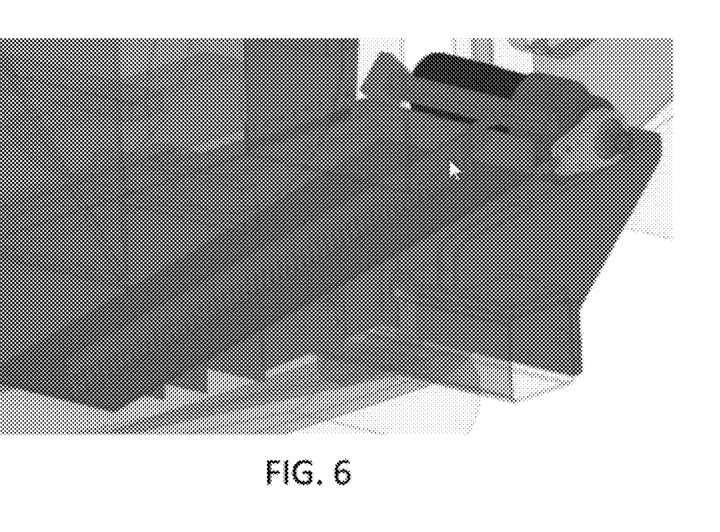
FIG. 6 is a perspective view of an exemplary conveyor and scraper installed in a crushing machine.
Figure 7:
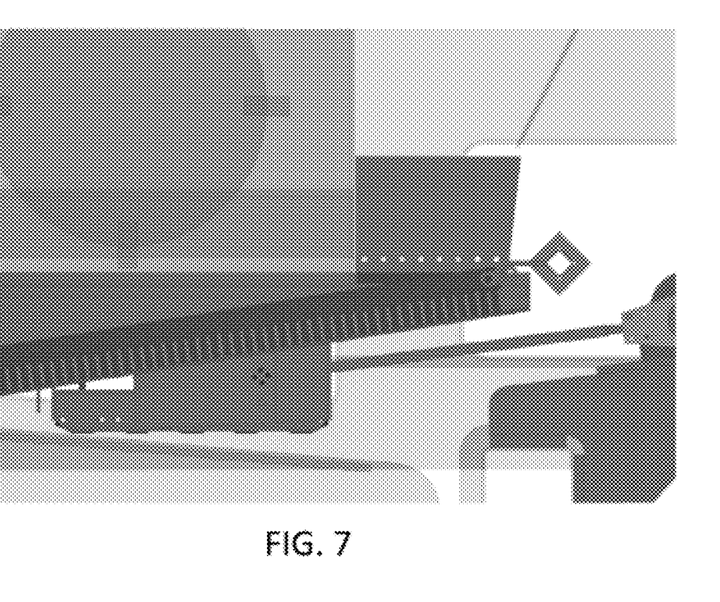
FIG. 7 is a side view of the exemplary conveyor, scraper, and crushing machine of FIG. 6.

Referring now to FIGS. 6-7, a three dimensional rendering shows an exemplary reciprocating conveyor and conveyor scraper installed in an crushing machine. As with FIG. 5, portions of the crushing machine are removed to show the arrangement of the conveyor and scraper. The scraper looks like a scraper of FIG. 2 of this application and runs nearly the whole length of the rectangular tray. FIG. 7 is a side view of the three dimensional model of the conveyor, conveyor scraper, and tray shown in FIG. 6.

Figure 8:
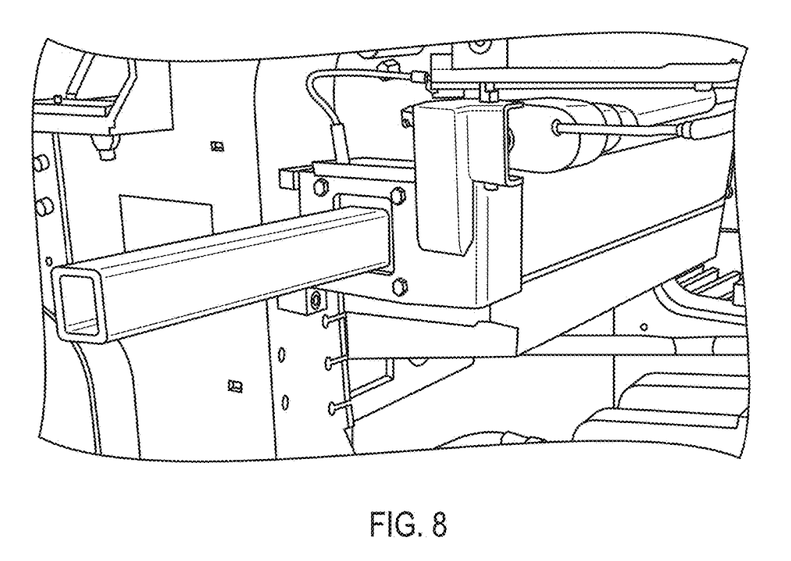
FIG. 8 is a photograph of an exemplary conveyor and scraper installed in a crushing machine.
Figure 9:
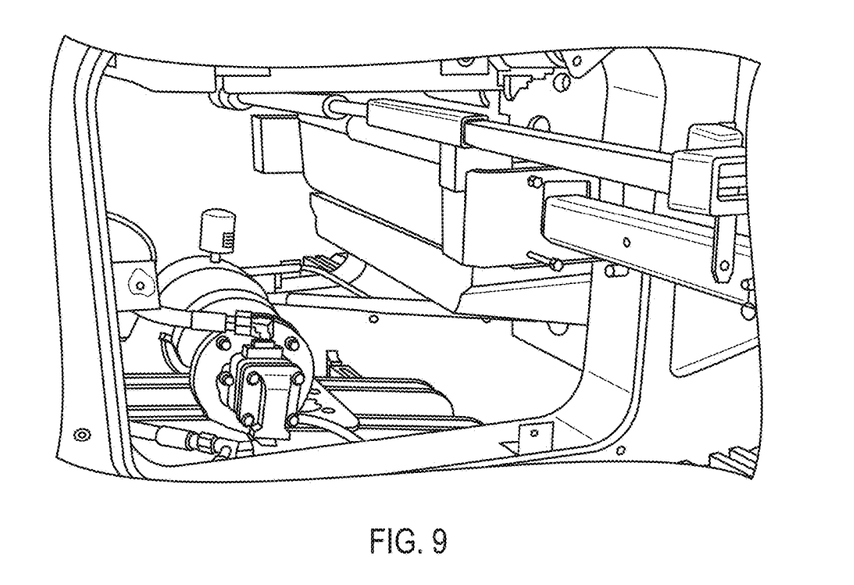
FIG. 9 is a photograph of the exemplary conveyor and scraper installed in a crushing machine taken from the opposite side of the crushing machine of FIG. 8.

Referring now to FIGS. 8 and 9, photographs show an exemplary conveyor and scraper installed in a crushing machine. FIG. 8 shows an actuator for a conveyor scraper, and the support bar and guide for the blade of the conveyor scraper. FIG. 9 shows the other side of the support and actuator of the conveyor scraper shown in FIG. 8. In this view the drive for the reciprocating conveyor is also visible.

Figure 10:
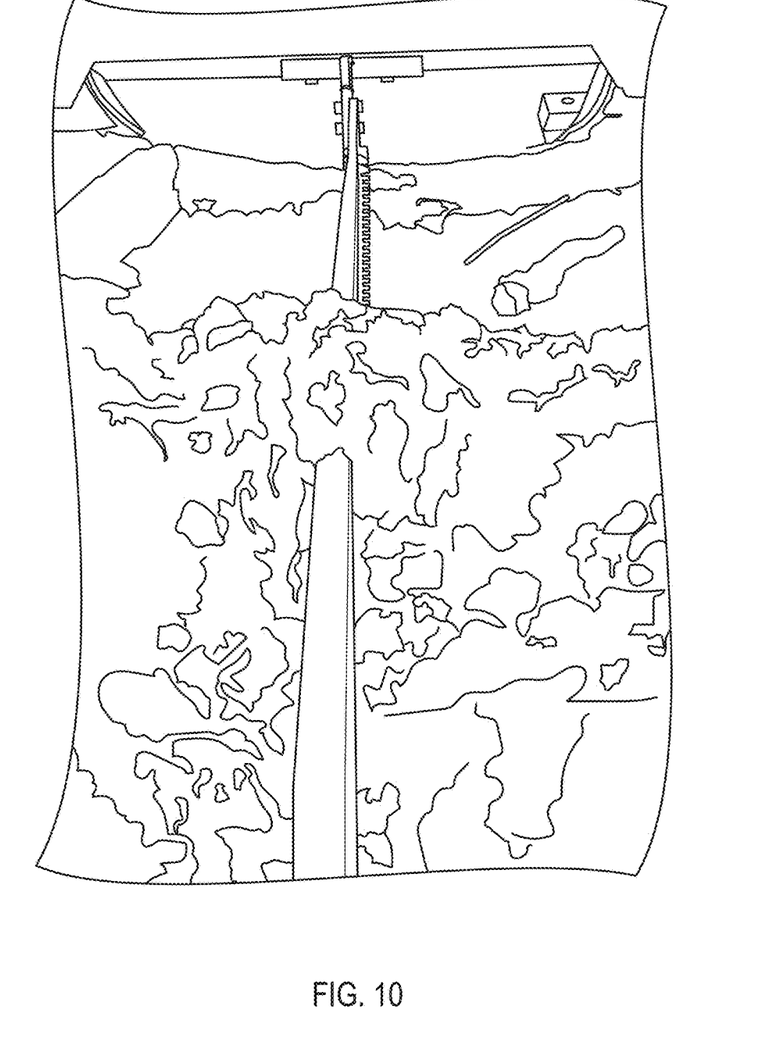
FIG. 10 is a photograph of an exemplary blade of an exemplary conveyor scraper taken from a distal end of the blade.

Referring now to FIG. 10, a photograph shows an exemplary blade of the exemplary conveyor scraper and crushed media on the reciprocating conveyor. This photo was taken at the distal end of the tray and shows the full length of the scraper in perspective with material collected on the reciprocating conveyor tray.

Figure 11A:
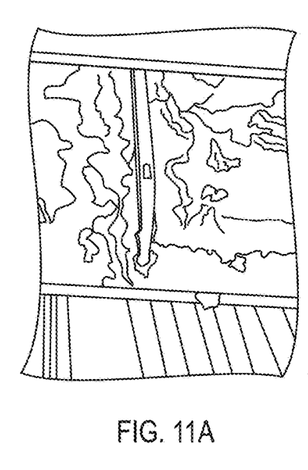
FIGS. 11A-11C are frames captured from a video of an exemplary conveyor scraper as it moves across an exemplary reciprocating conveyor.
Figure 11B:
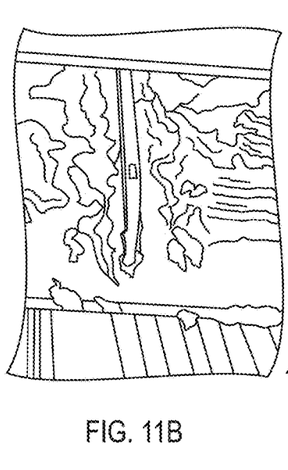
Figure 11C:
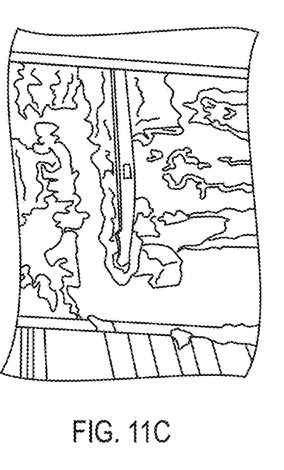

Referring now to FIGS. 11A-11C, frames captured from a video show the end of the blade of the conveyor scraper slowly moving from left to right as the reciprocating conveyor moves back and forth in the conveyance direction (up and down in this particular view). One can see a clean strip of tray to the left of the scraper blade starting to form in FIG. 11B and getting larger in FIG. 11C as the scraper moves slowly from left to right.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, instead of being straight, some or all of the blade of the conveyor scraper can be a zigzag or sinusoidal shape. As another example, a wearable material could be added to the blade, such as, for example, ultra high molecular weight polyethylene plastic. As yet another example, wider teeth can be added to the sides of the blade to extend further outward perpendicular from the blade. As yet another example, the blade can have a straight knife edge without teeth. As yet another example, the steps of all processes and methods herein can be performed in any order, unless two or more steps are expressly stated as being performed in a particular order, or certain steps inherently require a particular order. Accordingly, departures can be made from such details without departing from the spirit or scope of the applicant's general inventive concept.

What is claimed is:

1. A conveyor system for crushed media comprising:
a conveyor having a tray for receiving crushed media; and
a conveyor scraper comprising:
a blade having a plurality of teeth extending to the tray;
a blade support disposed proximate and transverse the tray of the conveyor;
a hingeable connection attaching the blade to the blade support;
at least one guide slideably supporting the blade support; and
at least one actuator for actuating the scraper;
wherein movement of the conveyor scraper across the tray prevents clay media from sticking to the tray of the conveyor.

2. The conveyor system of claim 1, wherein the blade of the conveyor scraper is moved in a reciprocating motion across the tray.

3. The conveyor system of claim 1, wherein movement of the blade is continuously back and forth.

4. The conveyor system of claim 1, wherein movement of the blade is intermittent.

5. The conveyor system of claim 1, wherein the blade completes one complete scraping cycle about every 10-300 seconds, or about every 30-240 seconds, or about every 40 seconds.

6. The conveyor system of claim 1, wherein the conveyor is moved in a reciprocating motion by a conveyor drive, movement in the forward direction being slower than movement in the backward direction.

7. The conveyor system of claim 1, wherein the actuator is selected from the group consisting of a hydraulic cylinder, a pneumatic cylinder, a linear actuator, a belt drive, a chain drive, and a gear drive.

8. The conveyor system of claim 1, comprising:
a first actuator for actuating the blade support; and
a second actuator for extending and retracting the blade relative the blade support.

9. The conveyor system of claim 8, wherein the first and second actuators move the blade in an elliptical path.

10. The conveyor system of claim 8, wherein the second actuator extends and retracts the blade at a frequency different than the frequency of the reciprocating conveyor.

11. A method of conveying crushed media comprising:
providing a conveyor having a tray for receiving crushed media;
providing a conveyor scraper comprising:
a blade having a plurality of teeth extending to the tray;
a blade support disposed proximate and transverse the tray of the conveyor;
a hingeable connection attaching the blade to the blade support;
at least one guide slideably supporting the blade support; and
at least one actuator for actuating the scraper;
reciprocating the tray more slowly in a direction of travel than in a return direction to cause the crushed media to move along the tray in the direction of travel; and
reciprocating the conveyor scraper across the tray to prevent the clay media from sticking.

12. The method of conveying crushed media of claim 11, wherein reciprocating of the conveyor scraper is continuous.

13. The method of conveying crushed media of claim 11, wherein reciprocating of the conveyor scraper is intermittent.

14. The method of conveying crushed media of claim 11, wherein reciprocating of the conveyor scraper has a period of about 10-300 seconds, or about 30-240 seconds, or about 40 seconds.

15. The method of conveying crushed media of claim 11, comprising reciprocating the tray with a drive unit to cause crushed media to move along the tray in a removal direction toward a distal end of the tray so that it falls off of the tray onto the conveyor.

* * * * *